Aug. 27, 1935.  J. F. SMART  2,012,323
THERMOSTAT
Filed Feb. 10, 1932
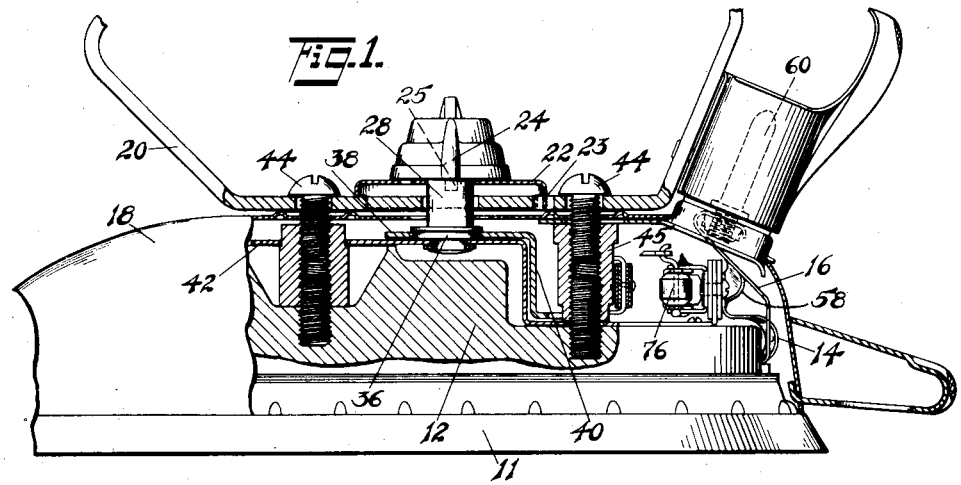
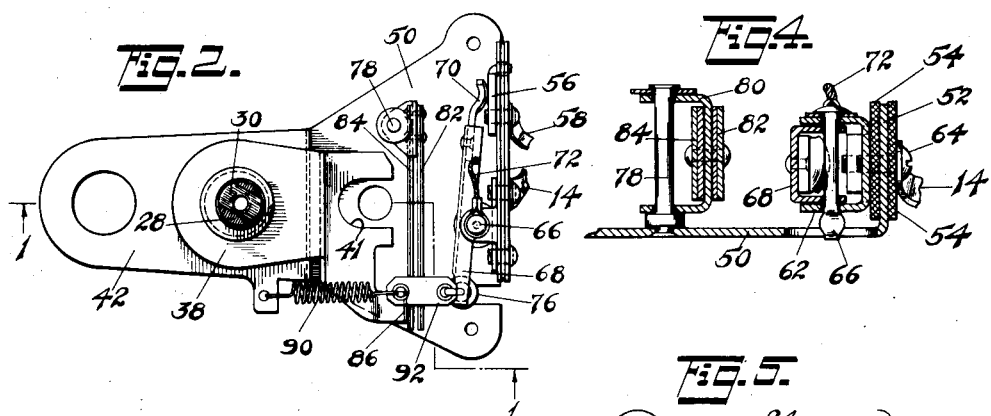
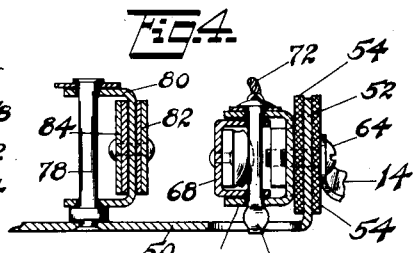
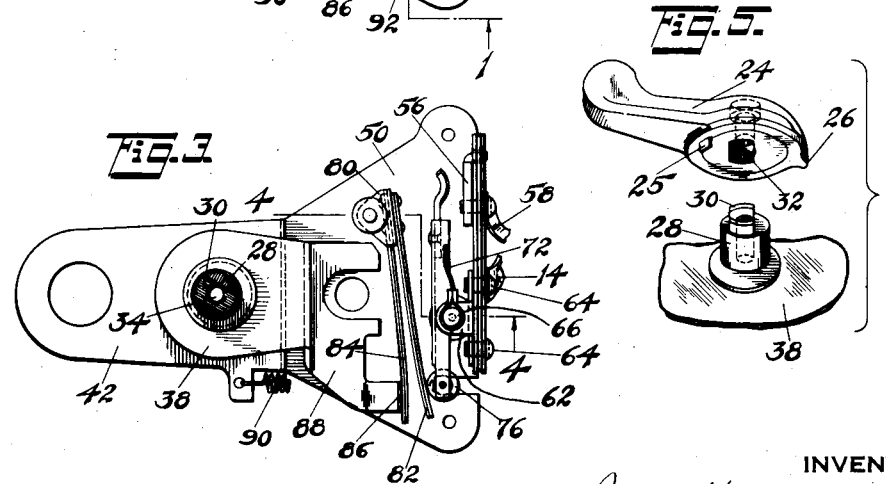
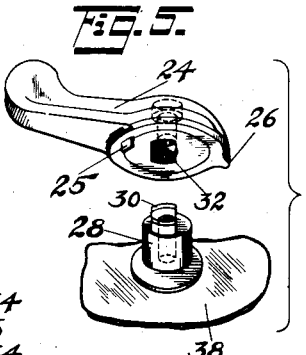
INVENTOR
Joseph Frederick Smart
BY his ATTORNEYS Patented Aug. 27, 1935

2,012,323

UNITED STATES PATENT OFFICE 2,012,323

THERMOSTAT

Joseph Frederick Smart, New Britain, Conn., assignor to Landers, Frary & Clark, New Britain, Conn., a corporation of Connecticut Application February 10, 1932, Serial No. 591,981

8 Claims. (Cl. 200—138)

The present invention relates to thermostat constructions and as an illustrative embodiment it is shown in connection with an electrically heated sad iron to which the invention is particularly though not exclusively adapted.

An object of the invention is to provide a thermostat construction and especially a thermostat controlled iron for use in connection with alternating current.

It is a further object of the invention to provide a slow-breaking thermostat with positive and powerful circuit breaking action.

Another object of the invention is to provide a novel construction of thermostat element and regulating means, said regulating means being adjustable by an indicating member so that the thermostat control can be set to maintain the heat at different desired points, such, for example, as high, medium and low.

A still further object of the invention is to provide, in connection with the regulating means, a construction insuring the assembly of the indicator in predetermined position so that it will correctly indicate the different degrees of temperature, relatively, which the thermostat may be set to maintain.

Further objects of the invention will appear from the following description taken in connection with the accompanying drawing which illustrates a preferred embodiment of the invention and in which—

Figure 1 is a fragmentary view, largely in vertical central section, on the line 1—1 of Figure 2, illustrating a sad iron embodying the invention;

Figure 2 is a top plan view of the thermostat construction of Figure 1, showing the thermostat members in inoperative position and the regulating means adusted to maintain a relatively high temperature;

Figure 3 is a top plan view showing the parts of Figure 2 in different positions, namely, with the thermostat members in circuit breaking position and the regulating means adapted to maintain a low temperature;

Figure 4 is a fragmentary vertical sectional view on the line 4—4 of Figure 3;

Figure 5 is a perspective assembly view illustrating the means for insuring assembly of the regulating and indicating lever in predetermined position to insure its correct function as an indicator.

Referring in detail to the drawing, a base 11 provides an ironing surface and carries the relatively heavy casting 12, the base and casting cooperating to carry and house the heating elements, not shown, of an electric circuit, the terminals of which connect with strip conductors 14 and 16. A cover 18 is provided as usual and carries on its top the handle frame 20 in the upper part of which is fixed the customary hand grip, not shown.

A relatively flat flanged disk 22 is located within and on the handle frame 20, being positioned thereon by a disk extension 23 entering an opening in the handle frame, and the disk may have marked thereon any desired indicia to indicate the relative degree of heat which the mechanism is set to maintain. Said indicia may conveniently indicate high, medium and low temperatures and the disk may be graded to indicate intermediate relative temperatures, if desired.

An indicating and operating lever arm 24 is provided with a pointer 26 which is mounted over the disk 22 and is fixed on a short cam shaft 28. To insure the assembly of the lever arm in corect position on the cam shaft to enable it to function properly as an indicator in connection with the disk 22, the cam shaft 28 is provided with an axially extending lug 30 which is preferably shaped as illustrated in Figure 5. As shown, the lug 30 is offset with respect to the axis of the cam shaft and has one face relatively near the shaft center of larger area than an opposite face located further away from the shaft center. The sides connecting these faces may be curved, as shown, and the lug 30, as a whole, is adapted to be received in a similarly shaped socket 32 provided in the underside of the lever arm 24. The shaft and lever arm are provided with openings in alignment when the lever arm is assembled on the shaft so that the lever arm can be secured in proper position by a screw taking into an axially extending tapped opening 34 in the cam shaft.

The cam shaft 28 extends downwardly through the handle frame 20 into the interior of the cover 18 and carries near its lower end a circular cam disk 36 axially offset and received within a circular opening in one arm 38 of a stud plate 40 adapted to be shifted by the cam to effect an adjustment hereinafter described. The lowermost end of the cam shaft 28 extends downwardly through an assembly plate 42 fixed to the casting 12 and may be prevented from upward movement in any desired manner. Retaining screws 44 secure the handle frame and cover plate to the casting 12.

At the rear and lower portion 50 of the carrier plate 42 said plate is turned upwardly to provide a mounting flange 52 provided on each side with an insulating strip 54 and to which is fixed the stationary member 56 of the circuit breaker and which connects by a conducting strip 58 with one of the usual socket terminals 60.

A bracket 62 is secured by screws 64 to the mounting flange 52, the bracket carrying the vertical pivot 66 on which is mounted a circuit breaker arm 68 to rock into and out of circuit breaking position. Carried by the circuit breaker arm 68 at one end thereof is the movable contact element 70 which moves into and out of contact with the stationary member 56 according as the circuit breaker arm is controlled by the thermostat member hereinafter described. The circuit from the stationary member 56 to the heating elements is traced through the movable contact element 70, flexible conduit 72, bracket 62 and strip conductor 14.

At the other end of the circuit breaker arm 68 is rotatably mounted an insulating roller 76 adapted for cooperation with one of the thermostat members now to be described.

Also mounted on the lower portion 50 of the carrier plate 42 is a vertical pivot 78 carrying a bracket 80 which is rockable about said pivot and has fixed thereto a pair of spaced apart thermostat member 82 and 84 which in their inoperative position or at ordinary room temperatures are substantially parallel, as shown in Figure 2. Upon sufficient increase of temperature, however, as when the iron is heated, the thermostat member 82 will curve as shown in Figure 3, and the thermostat member 84 will curve in the opposite direction so that when the temperature is increased sufficiently the thermostat member 82 will contact with the insulating roller 76 and the thermostat member 84 will contact with a thrust abutment 86 on the lower arm 88 of the stud plate 40. Since the thrust abutment 86 is immovable by the thermostat members, owing to its cam mounting, any further increase in temperature after thermostat member 82 contacts with insulating roller 76 will rock the circuit breaker arm 68 about its pivot 66 against the action of coil spring 90, one of whose ends is fixed to carrier plate 42 and the other of whose ends is connected by a link 92 with the roller carrying end of the circuit breaker arm, such action of the thermostat members separating the contact 70 from the contact 56 and thereby breaking the circuit and preventing further increase in temperature.

It is evident that the thermostat members will not operate to break the circuit until they have curved apart sufficiently to bridge the distance between the thrust abutment 86 and the insulating roller 76. To regulate this distance the lever arm 24 is moved to rotate the cam shaft 28 and thereby shift the arm 38 to increase or decrease the distance between thrust abutment 86 and insulating roller 76. The indicating pointer 26 of lever arm 24, in cooperation with the flanged disk 22, indicates to the user the relative temperature which will be reached before the heating circuit is broken.

The abutment plate 40 is guided in its adjusting movement by the spool 45 into which the rear assembly screw 44 is threaded, the abutment plate having a guide opening 41 for cooperation with said spool. Also, the indicating operating arm may be provided on its underside with a lug 25 which may project into a curved slot in the disk 22 for the purpose of limiting angular movement of the arm with respect to the disk.

By the construction described a positive and powerful slow breaking thermostat is provided especially adapted for use with alternating current. Moreover, due to the construction of the parts, it is impossible during assembly to place the indicator arm on the cam shaft in any but the correct position to indicate the relative temperature at which the circuit will be broken.

What is claimed is:

1. A thermostat construction including a thrust abutment for one of a pair of thermostat members, a circuit breaker having a contact roller, a pair of cooperating thermostat members between said thrust abutment and said circuit breaker, each member having one end secured to an end of the other, a common pivotal mounting for the ends secured together, said members extending from said ends in substantially the same direction from said pivot, their other ends being movable toward and away from each other by temperature change, one of said members being arranged to bear against said thrust abutment and the other to bear against the contact roller of said circuit breaker, said circuit breaker being movable by its associated thermostat member to open circuit position, spring means urging said circuit breaker into closed circuit position, and means for moving said thrust abutment toward and away from said circuit breaker.

2. A thermostat construction including a thrust abutment for one of a pair of thermostat members, a circuit breaker having a contact roller, a pair of cooperating thermostat members between said thrust abutment and said circuit breaker, each member having one end secured to an end of the other, a common pivotal mounting for the ends secured together, said members extending from said ends in substantially the same direction from said pivot, their other ends being movable toward and away from each other by temperature change, one of said members being arranged to bear against said thrust abutment and the other to bear against the contact roller of said circuit breaker, said circuit breaker being movable by its associated thermostat member to open circuit position, and spring means urging said circuit breaker into closed circuit position.

3. A thermostat construction including a pair of adjacent thermostat members, each having one end secured to an end of the other, a common pivotal mounting for the ends secured together, said members extending from said ends in substantially the same direction from said pivot, the other ends being movable toward and away from each other by temperature change, a thrust abutment for one of said members, a circuit breaker movable to open circuit position by the other of said members by increase of temperature, said circuit breaker comprising a rocking member pivoted intermediate its ends and having on one side of its pivot a circuit make and break portion and on the other side of its pivot an insulated thermostat member engaging roller, and circuit closing means acting on said circuit breaker and returning it to closed circuit position by decrease of temperature.

4. A thermostat construction including a pair of adjacent thermostat members, each having one end secured to an end of the other, a common pivotal mounting for the ends secured together, said members extending from said ends in substantially the same direction from said pivot, the other ends being movable toward and away from each other by temperature change, a thrust abutment for one of said members, a circuit breaker movable by the other of said members, said circuit breaker comprising a rocking member pivoted intermediate its ends and having on one side of its pivot a circuit make and break portion and on the other side of its pivot an insulated thermostat member engaging roller, and a spring device urging said rocking member constantly into circuit making position.

5. A thermostat construction including a pair of cooperating oppositely operable thermostat members, a circuit breaker movable to open circuit position by one of said members by increase of temperature, a thrust abutment for the other of said members, cam means for varying the position of said thrust abutment, and circuit closing means acting on said circuit breaker and returning it to closed circuit position by decrease of temperature.

6. In a thermostat construction, a thermostat device, a circuit breaker movable thereby, a thrust abutment therefor, a cam for varying the position of said thrust abutment, a cam shaft, a lever arm associated therewith and means for attaching said lever arm to said shaft including a screw and a positioning lug centering said lever arm in position on said shaft.

7. In a thermostat construction, a thermostat device, a circuit breaker movable thereby, a thrust abutment therefor, a cam for varying the position of said thrust abutment, a cam shaft, an indicating lever arm fixed on said shaft, and means for attaching said arm to said shaft comprising a screw and an offset positioning lug extending axially of said shaft, received within said arm, and insuring assembly of said arm and said shaft only in predetermined angular relation.

8. A thermostat construction, including a pair of cooperating and oppositely operable thermostat members, a circuit breaker movable to open circuit position by one of said members by increase of temperature, a thrust abutment for the other of said members, a plate element carrying said abutment, a cam cooperating therewith, means for moving said cam, and circuit closing spring means acting on said circuit breaker and returning it to closed circuit position by decrease of temperature.

JOSEPH FREDERICK SMART.